May 23, 1967

T. W. DAKIN ET AL  3,321,678
ELECTROLYTIC CAPACITOR ELECTRODE COMPRISING
ZIRCONIUM-NIOBIUM ALLOY COMPOSITION
Filed Sept. 3, 1964

WITNESSES:
Bernard R. Giegner
James F. Young

INVENTORS
Thomas W. Dakin and
William C. Divens.
BY
Frederick Hapoe
ATTORNEY

United States Patent Office

3,321,678
Patented May 23, 1967

3,321,678
ELECTROLYTIC CAPACITOR ELECTRODE COMPRISING ZIRCONIUM-NIOBIUM ALLOY COMPOSITION
Thomas W. Dakin, Murrysville, and William C. Divens, Pittsburgh, Pa., assignors to Westinghouse Electric Corporation, East Pittsburgh, Pa., a corporation of Pennsylvania
Filed Sept. 3, 1964, Ser. No. 394,108
2 Claims. (Cl. 317—230)

This invention relates to certain binary niobium base alloys, and more particularly, it pertains to electrolytic capacitors embodying electrodes of these alloys.

Electronic circuitry for civilian and military use is presently dependent upon tantalum electrolytic capacitors. Tantalum is highly reliable for that purpose, because it forms an adherent and uniform surface dielectric film of anodic oxide.

There are, however, some serious limitations to the use of tantalum. The world supply of tantalum and particularly that of the United States is limited. Moreover, purification and processing of tantalum to capacitor grade foils is exacting and costly. For example, iron is a typical impurity that cannot exceed 50 p.p.m. concentration in the tantalum. Small amounts of impurities in tantalum are extremely detrimental to its capacitor characteristics. Consequently, there is a need for other metals, or alloys, which are plentiful, less costly to process and fabricate, and which can be anodically coated to provide dielectric oxide films as effective as tantalum oxide for capacitor applications.

Unalloyed niobium does not form an anodic oxide that is comparable to tantalum oxide in properties desired for electrolytic capacitors. At high temperatures anodic niobium oxide is very susceptible to crystallization. Likewise, the anodic oxides of other unalloyed metals such as zirconium, titanium, and vanadium are inferior to tantalum oxide in properties related to capacitor performance. For that reason they are not as satisfactory as tantalum for use in electrolytic capacitors.

It has been found that niobium alloyed with predetermined amounts of zirconium or titanium is capable of being anodized to provide a unique mixed oxide dielectric. Low leakage currents and good life characteristics have been discovered in these alloys whereby capacitors having anodes of such alloys are useful for electronic purposes. The oxides of the niobium base binary alloys having the proper amounts of either zirconium or titanium do not readily convert from a low current leakage amorphous-like state to a high electrical leakage crystalline state. As a consequence, the working voltage of a capacitor using such alloys can more closely approach the formation voltage of the oxide than has been possible even with tantalum.

Accordingly, it is an object of this invention to provide specific binary alloys of niobium with zirconium or titanium for use as an anode in an electrolytic capacitor exhibiting properties and performance equal to or better than tantalum capacitors.

It is another object of this invention to provide binary niobium alloys with titanium or zirconium for use as anodes in an electrolytic capacitor capable of having anodized surface oxides which minimize leakage currents and provide good capacitor life characteristics.

It is another object of this invention to provide a binary niobium alloy having an anodic oxide film that is characterized by a high resistance to crystallization.

It is another object of this invention to provide a relatively high temperature electrolytic capacitor embodying certain binary niobium alloys and having superior properties and stability.

Finally, other objects of this invention will be evident from the following detailed description and drawing.

In the drawings forming part hereof, the preferred embodiment is shown by way of example:

Figure 1:
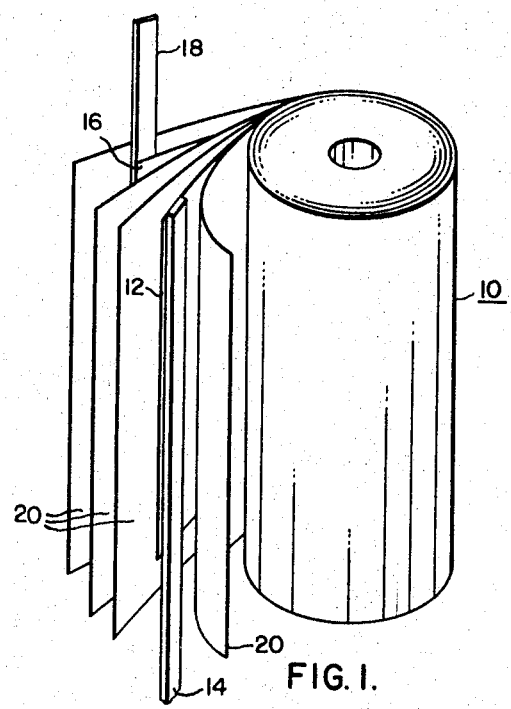
FIGURE 1 is a perspective view showing the manner in which layers of anodized alloy foils are rolled between layers of paper to form a cylindrical capacitor.

Broadly the invention comprises (1) preparing binary niobium base alloy with either titanium or zirconium being present in the required proportions, (2) working the alloy into a member having a large surface area to volume ratio, for instance as foil or wire, (3) anodizing the alloy member in a forming electrolyte to produce a dielectric film of amorphous oxide on its surfaces, (4) preparing a capacitor from the anodized alloy member by disposing an electrode near its surface, and (5) applying a working electrolyte to the assembly whereby a useful capacitor results.

Alloys for preparing capacitors in accordance with this invention comprise niobium base alloy compositions having from 96 to 50 atom percent of niobium and from 4 to 50 atom percent of either zirconium or titanium. One preferred composition being about 75% by weight of niobium and 25% zirconium, and the other preferred alloy having about 80% by weight of niobium and 20% titanium.

More specifically, the specific binary niobium base alloys of the present invention consist essentially of at least 4 atom percent and not more than 50 atom percent of titanium or zirconium (both latter elements being in Group IVb of the Periodic Table), the balance being niobium with small amounts of incidental impurities. On a weight basis, the alloys comprise (1) from about 2% to 34% of titanium, the balance being niobium, or (2) from about 4% to 49.5% of zirconium, the balance being niobium except for incidental impurities.

The best alloys from an overall standpoint of ease of foil preparation and outstanding capacitor properties comprise (1) from 20% to 30% by weight of zirconium, balance niobium and (2) from 15% to 25% by weight of titanium, balance niobium. The optimum compositions exhibited particularly low leakage currents.

It will be understood that the zirconium may be pure zirconium or the ordinary zirconium metal which may contain up to 2.3% by weight of hafnium. Likewise the niobium may contain small amounts of tantalum which is naturally present even after purification of columbite ore. The hafnium and tantalum are considered to be a part of the zirconium or niobium, respectively, and are not impurities.

The incidental impurities present in the alloy may total up to about 0.2%. Thus they may include up to 500 p.p.m. of iron, up to 700 p.p.m. of oxygen, up to 500 p.p.m. of silicon and smaller percentages of nitrogen, manganese and copper as well as other elements. A reasonably pure alloy is desired, but no special effects to reduce the impurities to an extremely low degree are necessary.

The binary alloys are easily prepared as ingots from available metal, and the resulting ingots are readily converted into foil, wire, sheets or other shapes adapted for capacitor uses. In some cases, the alloy in powdered form is compressed into a compact which is then sintered into a porous slug having a large extended surface area which can be anodized and used as a capacitor as is well known.

Ingots of the binary alloys may be prepared by conventional melting techniques which are used in processing titanium or zirconium, and then hot and cold worked into foil or other shapes. In preparing ingots, rods or bars of niobium are joined with rods or bars of zirconium (or titanium) in the desired weight proportions as by tack welding, to produce an elongated electrode which is then melted by either consumable arc or electron beam melting under a vacuum. The resulting ingot is preferably remelted at least once by consumable electrode or electron beam techniques under a vacuum of about 1 micron or less, into a homogeneous sound ingot. The resulting ingot is extruded or hot forged, or both, under a protective atmosphere into a plate, bar or rod. Plates or bars can be readily cold rolled from a thickness of 0.1 to 0.15 inch by means of a Rohn or Sendzimir mill into foil as thin as 0.0005 inch. Rod of a diameter of 0.5 to 0.25 inch can be drawn into wire of a diameter of 0.01 inch and less. The foils and wire are flexible and can be formed into capacitors.

The alloy members such as foil, wire, sheet or sintered compacts are then anodically oxidized in a forming electrolyte. Most electrolytes usable to anodize niobium or aluminum can be employed for this purpose. Dilute aqueous solutions of orthophosphoric acid, or orthophosphoric acid in mixtures of water and ethylene glycol or other liquid glycols, and dilute aqueous tartaric acid solutions are suitable forming electrolytes. The anodization may be carried out employing voltages up to 300 volts or higher. The anodization may be carried out at room temperature up to about 100° C., the higher temperatures requiring the use of ethylene glycol in the electrolytes. This treatment produces on all surfaces of the alloy exposed to the forming electrolyte an amorphous dielectric layer or film of mixed oxides. It is highly adherent and resists conversion to coarsely crystalline oxides.

In preparing a capacitor, the anodized alloy member, for example a foil, is associated with another sheet or foil to provide a cathodic electrode, with one or more intervening sheets of an insulating separator such as paper or glass cloth. The assembly so produced is then treated with a working electrolyte such as is usable with tantalum or aluminum capacitors. Examples of working electrolytes are borates-water-ethylene glycol; boric acid-ammonia-ethylene glycol; and dimethylformamide-tetraalkyl ammonium salicylate solutions.

Figure 2:
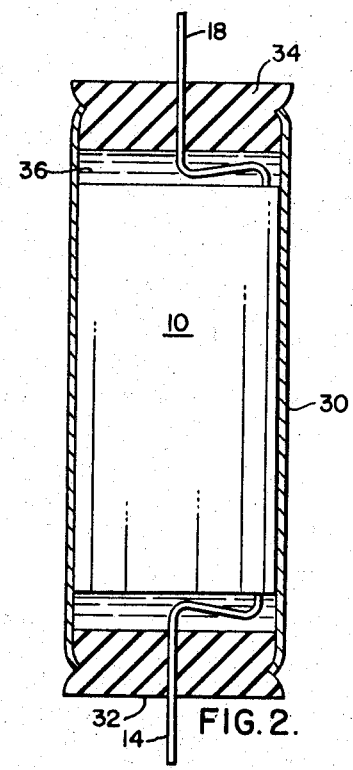
FIG. 2 is a vertical cross-section through a complete capacitor.

Referring to FIGS. 1 and 2 of the drawings, there is illustrated a roll capacitor embodying the invention. As shown in FIG. 1, a roll 10 is prepared by winding a foil 12 of the anodically oxidized binary alloy, which foil has a lead 14 crimped, welded or otherwise affixed to one end, together with a second foil 16, which may be of the same alloy though ordinarily anodized at a lower voltage, having a lead 18 affixed to one end thereof, and one or more sheets 20 of paper or other insulator between the foil turns. The resulting roll 10 is then placed in a casing 30 provided with insulating end disks or plugs 32 and 34 so that the casing is hermetically sealable. The leads 14 and 18 project through the disks 32 and 34 respectively, being sealed thereat, and can be connected into an electrical circuit thereby. The interior of the casing is filled with the working electrolyte 36. The casing 30 may be of metal or molded from a suitable glass or plastic.

A series of experiments were performed utilizing the alloys listed in Table I.

TABLE 1.—ALLOYS TESTED

| Alloy (Weight Percent) | Form | Size |
|---|---|---|
| 90% Nb, 10% Zr | Wire | 0.0075" diameter. |
| 75% Nb, 25% Zr | do | 0.010" diameter. |
| 70% Nb, 30% Zr | do | Do. |
| 50% Nb, 50% Zr | do | Do. |
| 100% Nb | Foil | 0.005" guage. |
| 75% Nb, 25% Zr | do | Do. |
| 98% Nb, 2% Ti | do | Do. |
| 80% Nb, 20% Ti | do | Do. |

All alloy members were first anodized to form an oxide dielectric in an electrolyte of 0.03% aqueous solution of tartaric acid which had been purified to remove all chloride ions. The purified acid was neutralized to a pH of 5.5 with ammonia before anodizing the members. Other electrolytes such as orthophosphoric acid, as well as unneutralized tartaric acid have also been used successfully.

The four wire samples of Table I were first anodized to 300 volts to form oxide layers. The samples were then tested under conditions simulating an electrolytic capacitor and found to be satisfactory.

A second series of experiments consisted of anodizing the foils of the alloys listed in Table I, including 0.0005 inch thick tantalum foil, to 100 volts. Some of the niobium foils used were in the unannealed condition, while several were annealed for 2 hours at 2000° C. before anodizing.

The foil alloys were anodized in the electrolyte corresponding to that described above for the wire alloys. The samples were then aged at 85° C. and 90 volts in a working electrolyte consisting of 7% by weight of ammonium pentaborate, 56% ethylene glycol, and 37% deionized water. The results of the aging tests are listed in Table II.

TABLE II.—CAPACITANCE AND LEAKAGE CURRENT FACTOR VALUES

| Alloy | Capacitance ($\mu$fd.) | $\mu$a./$\mu$f.-volt | | |
|---|---|---|---|---|
| | | At 25° C. Meas. at 75 v. | At 85° C. Meas. at 80 v. | At 85° C. after 400 hrs. at 90 v. Meas. at 80 v. |
| 100% Nb, not annealed | 0.098 | 0.07 | 6.0 | 5.1 |
| Do | 0.110 | 0.11 | 5.6 | 3.3 |
| 100% Nb, annealed at 2000° C. | 0.114 | 0.012 | 3.3 | 1.1 |
| Do | 0.120 | 0.036 | 4.1 | 10.0 |
| 98% Nb, 2% Ti | 0.112 | 0.013 | 1.85 | 0.15 |
| 80% Nb, 20% Ti | 0.241 | 0.014 | 2.3 | 1.1 |
| 75% Nb, 25% Zr | 0.186 | .0078 | 3.6 | 0.03 |
| 100% Ta | 0.212 | 0.033 | 2.0 | 0.04 |

$\mu$a.=microamperes leakage current.
$\mu$f.-volt=microfarad times voltage.

The 75% Nb–25% Zr alloy had the best combined properties of high capacitance and low leakage currents of any of the sample. The 80% Nb–20% Ti alloy appeared to be the next best taking into account that most of the observed leakage currents were due to external shunting and not through the oxide.

In all of the 100% niobium samples the oxide flux had crystallized completely instead of being amorphous whereas the alloy samples showed no evidence of crystallization of the oxide.

The data of Table II are conservative because an uncontrolled shunt leakage current existed over the anodized surfaces between the electrolyte and the non-anodized metal. A third set of experiments eliminating much of the shunt leakage currents was made with the metals and alloys shown in Table III. The samples were anodized a 100 volts at 25° C. in a working electrolyte of 0.03% neutralized tartaric acid as above, and aged in a working electrolyte of 16% NaSO₄ acqueous solution. Before anodizing each sample was precleaned with one of the following solutions:

Etch #1:                                                 Parts
    Conc. $H_2SO_4$ _____ 5
    Conc. $HNO_4$ _____ 2
    48% HF _____ 2
Etch #2:
    Conc. $H_2SO_4$ _____ 1
    Distilled water _____ 1
Etch #3:
    Conc. $H_2SO_4$ _____ 5
    Distilled water _____ 2
    48% HF _____ 2

The nature of the cleaning etchant does not appear to be critical.

TABLE III

| No. | Metal | Annealing |
|---|---|---|
| 2A | 100% Nb | No annealing. |
| 2A′ | 100% Nb | Do. |
| 2B | 100% Nb | 2 hrs. at 2,000° C. |
| 2B′ | 100% Nb | 2 hrs. at 2,000° C. |
| 3A | 75% Nb, 25% Zr | No annealing. |
| 3A′ | 75% Nb, 25% Zr | Do. |
| 3B | 75% Nb, 25% Zr | 2 hrs. at 1,800° C. |
| 5A | 80% Nb, 20% Ti | No annealing. |
| 5B | 80% Nb, 20% Ti | Do. |

Figure 3:
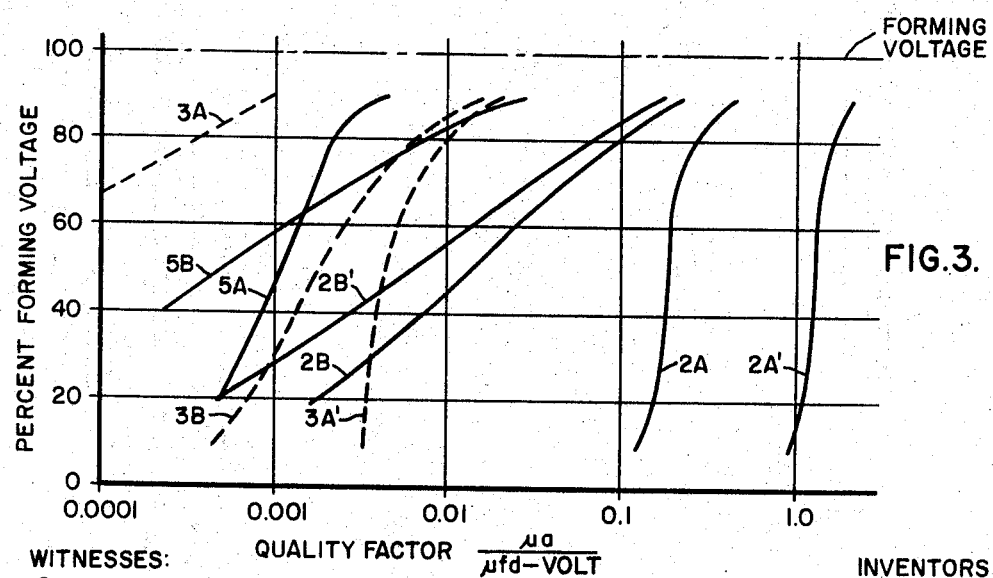
FIG. 3 is a graph showing the relative quality of anodized niobium and niobium alloy capacitors.

FIG. 3 is a chart showing curves which were produced by plotting percent forming voltage vs. quality factor $$\left(\frac{\mu a.}{\mu f.\text{-volt}}\right)$$

for each sample in Table III. The curves on the chart were derived from initial measurements of the samples. The testing was conducted at 85° C. and at voltages going up to 90 volts in a 16% $Na_2SO_4$ solution. It will be observed that the leakage current in tests at 80% of the forming voltage of the niobium units 2A, 2A′, 2B and 2B′ are at least an order of magnitude higher than for the binary alloy units. The alloys having 25% by weight of zirconium or 20% by weight of titanium show satisfactory low current leakage values, and are particularly usable capacitor anode-electrode alloys. However, the 20% by weight titanium alloy is somewhat easier to roll to foil form than is the 25% zirconium alloy.

The tests in Table IV indicate that the binary alloy of 75% by weight niobium and 25% zirconium has the excellent electrolytic capacitor properties and it also has great stability. On all comparative tests the 25% zirconium-75% niobium alloy appears to be optimum for capacitors.

TABLE IV.—LIFE TEST OF A Nb 75%, Zr 25% CAPACITOR FORMED AT 290 V.

| Temp., °C | Time, hrs. | Voltage | C, μf.[1] | tan S [2] | I/VC |
|---|---|---|---|---|---|
| 25 | 0 | 150 | .123 | ---- | ---- |
| 125 | 82 | 144 | .151 | .06 | .0084 |
| 125 | 600 | 150 | .144 | .08 | .0056 |
| 25 | 600 | 150 | .114 | ---- | ---- |
| 125 | 1,600 | 148 | .117 | .03 | .0052 |
| 25 | 1,700 | 150 | .110 | ---- | ---- |
| 125 | 2,000 | 147 | .115 | ---- | .0052 |
| 125 | 4,400 | 147 | .113 | ---- | .0052 |
| ---- | ---- | ---- | ---- | ---- | .0071 |

[1] Approximately 0.5 sq. in.
[2] Value includes series electrolyte resistance, while extrapolated tan S, eliminating this series resistance, indicates a value of 0.012 tan S for the oxide film at 125° C.

The binary alloys of the present invention have better electrolytic capacitor properties and greater stability than tantalum. Although unalloyed niobium is decidedly inferior to unalloyed tantalum in capacitors, the alloys of about 75% by weight of niobium and 25% zirconium and of about 80% by weight of niobium and 20% titanium have a combination of electrolytic capacitor properties and stability equal to or better than that of tantalum. Moreover, the present invention indicates that oxides of niobium binary alloys with from 4 to 50 atomic percent of either zirconium or titanium inhibit crystallization that ordinarily occurs in unalloyed niobium. The anodized oxide of the alloys retain desirable electrical capacitor properties.

Accordingly capacitors formed of the binary alloys may be used in the electronic component field. The anodic alloy films are potentially useful as electrodes or anodes for dry film capacitors with an evaporated metal counter electrode such as aluminum deposited over the anodic oxide film as well as with electrolytic capacitors.

It will be understood that the present description and drawings are illustrative and not limiting.

We claim as our invention:

1. In an electrolytic capacitor, an electrode consisting of an alloy of from 20% to 30% by weight of zirconium with not over 2.3% of the zirconium comprising hafnium, the balance being niobium and small amounts of incidental impurities in an amount of not over about 0.2%, the electrode having an amorphous anodic dielectric surface oxide highly resistant to crystallization at operating temperatures and exhibiting low discharge currents.

2. In an electrolytic capacitor, an electrode consisting of an alloy of from 15% to 25% by weight of titanium, the balance being niobium and small amounts of incidental impurities in an amount of not over about 0.2%, the electrode having an amorphous anodic dielectric surface oxide highly resistant to crystallization at operating temperatures and exhibiting low discharge currents.

References Cited by the Examiner
UNITED STATES PATENTS
3,244,946  4/1966  Hilton _____ 317—230

References Cited by the Applicant
UNITED STATES PATENTS
3,126,503  3/1964  Salomon.

JAMES D. KALLAM, *Primary Examiner.*